June 13, 1961   H. J. EICHEL   2,988,460
ADHESIVE TAPE
Filed May 5, 1958
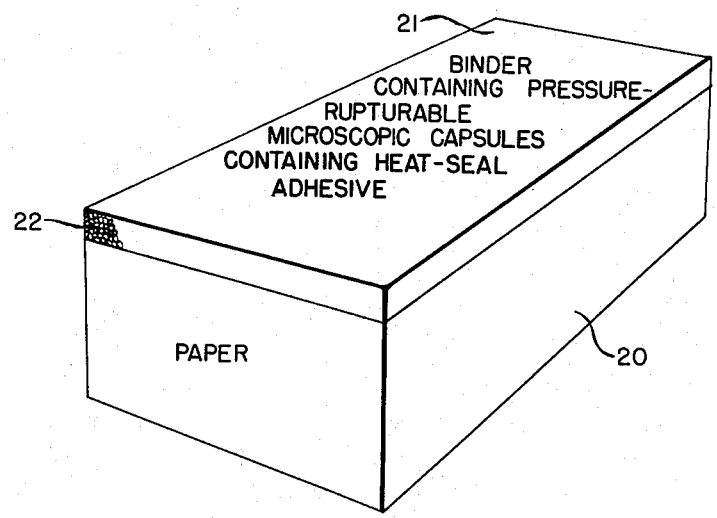
INVENTOR
HERMAN J. EICHEL
BY
HIS ATTORNEY

2,988,460
ADHESIVE TAPE
Herman J. Eichel, Dayton, Ohio, assignor to The National Cash Register Company, Dayton, Ohio, a corporation of Maryland
Filed May 5, 1958, Ser. No. 733,149
3 Claims. (Cl. 117—122)

This invention relates to a novel adhesive tape consisting of a film-like base web with a novel adhesive coating including a profusion of microscopic pressure-fracturable capsules, each of which capsules contains an adhesive material which is substantially non-flowing at room temperature, but which may be made tacky and flowing at a temperature substantially above 100 degrees Fahrenheit.

The capsules in unfractured condition keep the adhesive entrapped even though heated and in flowing condition, and, so, the capsules must be fractured before the tape is applied by heat to the receiving material, the fracture of the capsules allowing the adhesive to escape when the adhesive is brought to flowing temperature. The fracturing of the capsules may take place at the completion of the coating process or just before use, by calender rolls.

Ordinary handling and packing pressures will not cause the tape to stick to itself or any other material, if the capsules are not fractured. If the capsules are fractured, heat to cause a temperature of above 100 degress Fahrenheit must be applied before the adhesive in the capsules will flow out of the fractures in the capsules to cause the tape to become an active adhesive tape. Upon cooling, the exuded adhesive assumes a solid or very viscous state so the tape sticks to the material to which it is applied by heat.

The film-like base preferably is paper although the adhesive coating may be applied to any film which has characteristics like paper, such as regenerated cellulose, polyethylene terephthalate, woven cloth, and the like.

The conventional temperature for application of the tape is in the region of 250 to 400 degrees Fahrenheit, and the heat may be applied by a sealing iron. A typical example of the novel heat seal paper will be described with reference to the drawing in which 20 is a web of paper or one of the described equivalents; and 21 is a film coating thereon consisting of pressure-fracturable microscopic capsules containing normally substantially non-flowable adhesive, such as capsules 22. The capsules may be made by a process of coacervation in the manner set forth in U.S. Patent No. 2,800,457, which issued on the application of Barrett K. Green and Lowell Schleicher on July 23, 1957, the essence of that patent being the making of fluid-containing microscopic pressure-rupturable capsules by a process of coacervation in which hydrophilic colloid shells are formed around microscopic droplets of a fluid material. There is no teaching in that patent of the use of such capsules containing a heat-sensitive adhesive which may be utilized to attach an adhesive film containing such capsules to a receiving sheet such as the wrappings of merchandise.

In the process of coacervation the temperature is kept above the flow point of the adhesive so it may form the internal phase of an emulsion.

In this invention the ratio of encapsulated adhesive to the encapsulating wall of material is relatively high, the enclosed adhesive being about twelve times as much, by weight, as the encapsulating shell material which preferably is a complex of gelatin and gum arabic.

In a particular embodiment paper will be used as the base web, and will be of a weight which equals 60 pounds per ream of 25" x 38", although such weight may be varied considerably.

The film coating of adhesive-containing capsule material may be made as follows, although variations from the formulation might be made to suit individual needs. Dissolve 5 parts, by weight, of pigskin gelatin having its isoelectric point at pH 8, in 100 parts, by weight, of water and mix therein 120 parts, by weight, of a mixture of 35 parts, by weight, of rubber hydrochloride of a viscosity at room temperature (70 degrees Fahrenheit) of 125 centipoises; 15 parts, by weight, of a polymerized rosin having a melting point of 208–217 degrees Fahrenheit; 20 parts, by weight, of hydro-abietyl phthalate; 10 parts, by weight, of di-n-octyl-n-decyl phthalate; 5 parts, by weight, of chlorinated diphenyl having a specific gravity of 1.378–1.388; 40 parts, by weight, of chlorinated diphenyl having a specific gravity of 1.740–1.745; all dissolved in 50 parts, by weight, of toluene, to form an emulsion. Next prepare a sol consisting of 5 parts, by weight, of gum arabic in 100 parts, by weight, of water. The gelatin emulsion is stirred into one-half liter of water and the gum arabic sol is mixed therein. This mixture is diluted with water to make one liter of emulsion with a pH of about 7. The pH of the mixture is then lowered to about 4.5 by the addition of 15 percent acetic acid in water. Up to this point the ingredients are kept at about 130 degrees Fahrenheit, which is above the gelling point of the gelatin. At this stage of the process, the resultant gelatin-gum arabic complex has been deposited as liquid capsule walls around the individual droplets of the adhesive mixture, which droplets at this point are also in liquid form. By continuous stirring these liquid capsules are kept dispersed in the remaining aqueous phase until hardened and gelled. The hardening of the capsule walls is brought about by introducing into the hot dispersion 1 gram of 42 percent, by weight, of formaldehyde in water and then cooling the dispersion to 50 degrees Fahrenheit. Five milliliters of 5 percent aqueous solution of polyvinylmethyl ether/maleic anhydride copolymer is added to keep the, then, gelled and hardened capsules from aggregating. Next the pH is brought up to 9 by sodium hydroxide solution, at which point the encapsulation is complete.

The finished dispersion is coated on the web to the desired thickness and dried at 150 degrees Fahrenheit to drive off the residual liquid leaving a non-tacky coating containing the capsules which enclose a nearly solid adhesive which may be rendered mobile by heat substantially above 100 degrees Fahrenheit.

In order that this encapsulated adhesive be made available the capsules must be fractured before the coated paper is applied as a tape by the use of heat. This cracking may be accomplished by passing the coated paper through calender rolls either at the end of the coating operation or just before application of the coated paper to the receiving material. The fractured capsules will not release the adhesive until heated above 100 degrees Fahrenheit, as it is too nearly a solid to escape at lower temperatures. The capsule walls act as protection against the sticking of the tape to itself caused by pressure encountered in stacking or rolling of the coated paper in tightly wound rolls.

The adhesive tape may be applied to the receiving material with a hot iron of a temperature of from 250–400 degrees Fahrenheit, which heat renders the capsule-enclosed adhesive very fluid so it may escape easily from the fractured caspules. As the applied label cools to room temperature the adhesive becomes nearly a solid, holding the tape on the receiving material. The coated adhesive tape may be printed or cut into label size, printed or not, as is common practice.

It is to be understood that the tape may be as wide as desired and such wide tape may be cut into lengths to form adhesive sheets, and that narrow tape may be cut into short lengths to form adhesive labels.

What is claimed is:

1. A heat activatable adhesive tape consisting of a supporting web having a coating of pressure-fracturable capsules, each capsule containing an adhesive which is tacky but non-flowing at room temperature and which only is activatable to a flowing condition when heated substantially above 100 degrees Fahrenheit, so that when the capsules are fractured the tape may be adhesively applied to a receiving material when heated to the adhesive flow point making possible its escape from the fractured capsules.

2. An adhesive tape including a base web coated with fracturable microscopic capsules containing a normally tacky but non-flowing adhesive which adhesive, only when activated by heat substantially above 100 degress Fahrenheit, will flow out of fractured capsules but not out of unfractured capsules.

3. An adhesive sheet including a base web; and a coating on the base web including a profusion of pressure-fracturable microscopic capsules each containing adhesive material which changes from a non-flowing adhesive to a flowing adhesive only when heated substantially above 100 degrees Fahrenheit, the adhesive material escaping through the fractures in fractured capsules when in flowing condition, but retained in the unfractured capsules when in non-flowing condition.

References Cited in the file of this patent
UNITED STATES PATENTS

| | | |
|---|---|---|
| 1,769,627 | Fischer | July 1, 1930 |
| 1,954,219 | Moyses | Apr. 10, 1934 |
| 2,376,778 | Kallander | May 22, 1945 |
| 2,730,456 | Green et al. | Jan. 10, 1956 |
| 2,800,457 | Green et al. | July 23, 1957 |
| 2,907,682 | Eichel | Oct. 6, 1959 |

FOREIGN PATENTS

| | | |
|---|---|---|
| 456,471 | Great Britain | Nov. 10, 1936 |